United States Patent [19]

Hozumi et al.

[11] Patent Number: 5,382,993
[45] Date of Patent: Jan. 17, 1995

[54] IMPRINTING CAMERA SYSTEM WITH DATA CHANGEOVER CAPABILITY

[75] Inventors: Toshiaki Hozumi, Tokyo; Hidehiro Ogawa, Funabashi, both of Japan

[73] Assignee: Nikon Corporation, Tokyo, Japan

[21] Appl. No.: 107,168

[22] Filed: Aug. 17, 1993

[30] Foreign Application Priority Data

Aug. 19, 1992 [JP] Japan .................. 4-220454

[51] Int. Cl.⁶ ............................................. G03B 17/24
[52] U.S. Cl. ................................................... 354/106
[58] Field of Search ............................ 354/105, 106

[56] References Cited

U.S. PATENT DOCUMENTS

| | | | |
|---|---|---|---|
| 4,814,802 | 3/1989 | Ogawa | 354/105 |
| 5,155,513 | 10/1992 | Matsumura et al. | 354/106 |
| 5,229,810 | 7/1993 | Cloutier et al. | 354/106 X |

FOREIGN PATENT DOCUMENTS 63-141034  6/1988  Japan .
2-293723  12/1990  Japan .

*Primary Examiner*—Howard B. Blankenship
*Attorney, Agent, or Firm*—Oliff & Berridge

[57] ABSTRACT

In this camera system capable of imprinting data on film, imprint data setting elements SW11 and 61 select and set imprint data, which may be film specific imprint data and/or frame specific imprint data. Commanding elements SW12 and SW13 command a first imprinting operation in which data so set is imprinted as frame specific imprint data in a predetermined imprinting position for each film frame, and command a second imprinting operation in which data so set is imprinted as film specific imprint data in another position differing from all the imprinting positions for the film frames, for example on the header portion of the film. An imprinting device 62 and 63 performs the first imprinting operation and/or the second imprinting operation according to the commands issued by the commanding elements, and a data changeover signal output device 51, when the second imprinting operation is ordered, outputs a data changeover signal before the second imprinting operation, if frame specific imprint data is set by the setting elements. Accordingly, before performing the second imprinting operation, it is possible to change over this improperly set frame specific imprint data, which has no meaning as film specific imprint data when not associated with any particular film frame, to appropriate film specific imprint data.

19 Claims, 13 Drawing Sheets

IMPRINTING CAMERA SYSTEM WITH DATA CHANGEOVER CAPABILITY

BACKGROUND OF THE INVENTION

1. Field of the Invention

The present invention relates to a camera system which, during photography, can imprint data relating to the photographic conditions in which photography takes place on each film frame within the picture area of the film frame or on a portion of the film outside but in the vicinity of the film frame, and moreover can imprint other data on the film in a different place.

2. Description of the Related Art

Various types of camera systems have been proposed which, as each frame of a film is shot, can imprint data specific to the frame being shot—such as date of photography, values for exposure, film frame number in series, or other information relating to the conditions in which photography takes place—within the picture area of the film frame or on a portion of the film in the vicinity of the film frame. Further, in Japanese Laid Patent Heisei Publication No. 2-293723, there is disclosed a camera system which is also capable of imprinting data such as the date of start of shooting the film or the film serial number on the leader portion of the film which is closer to its front end portion than the first frame to be shot on the film. (This leader portion of the film will hereinafter be termed the zeroth frame area of the film.) With this camera, it is possible by operating various controls for the user of the camera to set up the appropriate values of the information which he or she desires to imprint onto the film.

The so called film specific information which it is desired to imprint on the zeroth film frame area may be for example the date of start of shooting the film or the film serial number, but there is no meaning in imprinting any so called frame specific information such as for example values for exposure and/or film frame number on the zeroth film frame area. However, with the camera disclosed in the above identified Japanese Laid Patent Publication, if the user should forget to change the settings for the imprint data, or should establish erroneous settings, then there is a risk that frame specific data which have no meaning will be imprinted on the zeroth film frame area.

SUMMARY OF THE INVENTION

The object of the present invention is to provide a camera system which is capable of imprinting data on the film, and which guards against imprinting of undesired frame specific information on the zeroth film frame area.

In order to attain this object, the present invention proposes a camera system capable of imprinting data on film, comprising: (a) an imprint data setting means for selecting one of imprint data from film specific imprint data and frame specific imprint data and setting thus selected imprint data; (b) a commanding means for commanding a first imprinting operation in which data so set is imprinted in a predetermined imprinting position for each film frame, and for commanding a second imprinting operation in which data so set is imprinted in another position differing from all said imprinting positions for said film frames; (c) an imprinting means for performing said first imprinting operation and for performing said second imprinting operation according to the command of said commanding means; (d) a determining means for determining whether frame specific imprint data is set by said imprint data setting means and (e) a data changeover signal output means for, when said second imprinting operation is ordered, outputting a data changeover signal before said second imprinting operation, if the determining means determines frame specific imprint data is set by said setting means.

According to the present invention as specified above, when the second imprinting operation is ordered, if frame specific imprint data is set by the setting means, then, before the second imprinting operation is actually performed, the data changeover signal is output. In response to this data changeover signal, if for example the imprint data is changed over to film specific imprint data, then even if the camera user forgets to reset the imprint data type for use with the second imprinting operation, i.e. the film specific imprinting operation, or sets the film specific imprint data type erroneously, it is positively prevented that meaningless information, only suitable as frame specific information, should be imprinted as film specific information, and accordingly it is possible positively to ensure that appropriate or at least meaningful film specific information is imprinted.

If in response to the above described data changeover signal the imprint data is changed to film specific data, the user of the camera is not put to the trouble of amending and correcting the imprint data manually, and it is ensured that meaningful film specific information is imprinted.

On the other hand, if in response to the above described data changeover signal a warning is emitted—which may be an audible warning or a visible warning—it is possible for the user of the camera to realize from this warning that an improper or erroneous imprint data type has been set. Accordingly, by the camera user being given an opportunity in this way to amend and correct the imprint data manually, a similar result is obtained, in that it can be ensured that meaningful film specific information is imprinted.

According to another aspect of the present invention, there is proposed a camera system capable of imprinting data on film, comprising: (a) an imprint data setting means, of the type specified above, for selecting one of imprint data from film specific imprint data and frame specific imprint data and setting thus selected imprint data; (b) a commanding means, of the type specified above, for commanding a first imprinting operation in which data so set is imprinted in a predetermined imprinting position for each film frame, and for commanding a second imprinting operation in which data so set is imprinted in another position differing from all said imprinting positions for said film frames; (c) an imprinting means, of the type specified above, for performing said first imprinting operation and for performing said second imprinting operation according to the command of said commanding means; (d) a determining means for determining whether frame specific imprint data is set by said imprint data setting means and (e) a data changeover signal output means, of the type specified above, for, when said second imprinting operation is ordered, outputting a data changeover signal before said second imprinting operation, if the determining means determine frame specific imprint data is set by said setting means; wherein (f) said data setting means comprises a first changeover means, of the type specified above, for changing over the setting for said imprint data to film specific data in response to said data changeover signal, and a second changeover means for, when both said first imprinting operation and also said second imprinting operation are commanded, after said second imprinting operation has been completed using the film specific data to which the setting was changed over to by said first changeover means, returning the setting for the imprint data to its original frame specific setting, before performing said first imprinting operation.

According to this aspect of the present invention as specified proximately above, after temporarily the imprint data has been changed over for said second imprinting operation, the imprint data is returned to its original setting for imprinting frame specific data, without any requirement for the camera operator to take any manual action.

DESCRIPTION OF THE PREFERRED EMBODIMENTS

Preferred Embodiment 1

The first preferred embodiment of the present invention will now be explained with reference to FIGS. 1 through 6 of the appended drawings.

Figure 2:
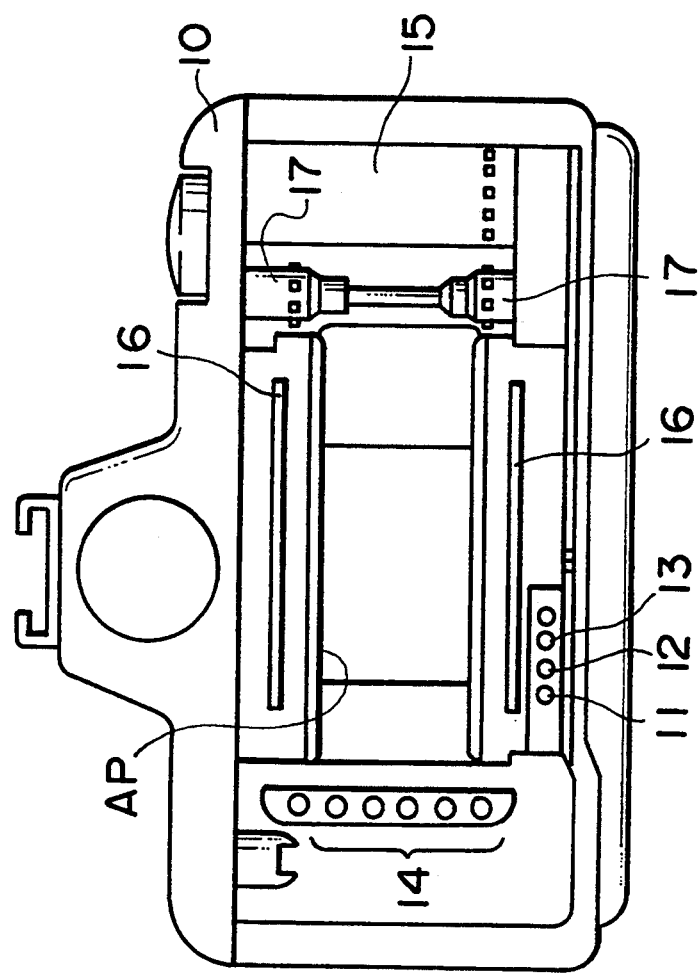
FIG. 2 is a rear view of this camera shown with a rear film lid thereof removed.

FIG. 2 is a rear view of a camera according to the first preferred embodiment of the present invention shown with its rear film lid removed. In the camera main body, denoted as 10, there are provided contacts 11, 12, and 13 for supplying electrical power and control signals to an imprinting device which is provided in a rear film lid 20, not visible in FIG. 2 but particularly shown in FIG. 3, and also there is provided a set of DX contacts 14 for reading out a film sensitivity signal from a DX code on the film cartridge (not particularly shown). Further, there are provided a film takeup spool 15 for winding up the film (not shown either) which is pulled out from the film cartridge past the camera aperture (denoted as AP), upper and lower guide rails 16 for increasing the positional stability of the film during its transfer from the film cartridge to the film takeup spool 15, and a pair of upper and lower film feed sprockets 17 formed with sprocket teeth which engage with perforations formed in the edge of the film to guide the film and to help it along its transport path.

Figure 3:
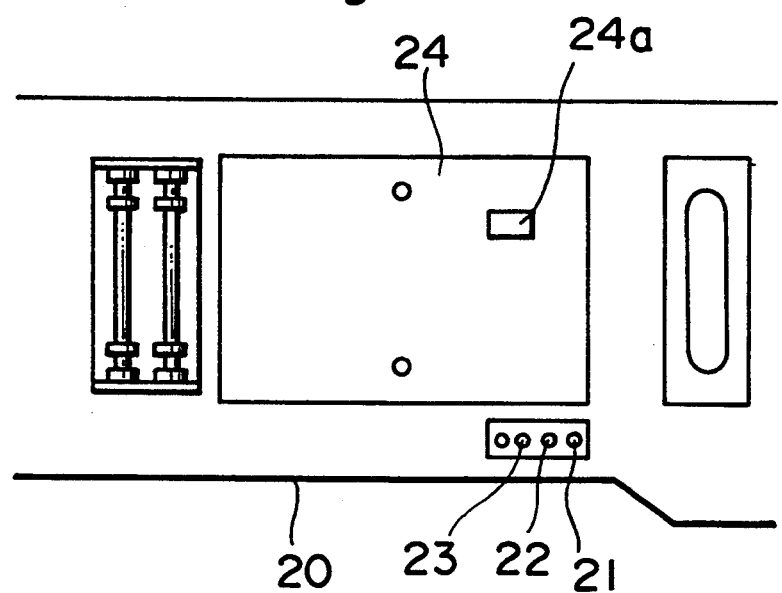
FIG. 3 is a view of the inside surface of said rear film lid as seen from the direction of the main body of the camera.

FIG. 3 shows a view of the inside surface of the rear film lid 20 as seen from the direction of the main body 10 of the camera. This rear film lid 20 can be hinged to and fro as desired along a hinge not shown in the figures, so as either to close against the camera main body 10 or to leave it open as shown in FIG. 2, and on the inside surface of the rear film lid 20 there are provided contacts 21, 22, and 23 for making contact with the contacts 11, 12 and 13. Further, there is provided a pressure plate 24 for ensuring that the film is held flat as it passes past the aperture AP and frames are shot. When the rear film lid 20 is closed against the camera main body 10, the contacts 21, 22, and 23 contact against the contacts 11, 12, and 13, and an electrical system housed within the camera main body 10 and an imprinting device provided within the rear film lid 20 are electrically connected together. A film imprinting window 24a is formed through the pressure plate 24, for allowing the passage of light rays from the imprinting device so that they can perform imprinting on the film as will be explained hereinafter.

Figure 4:
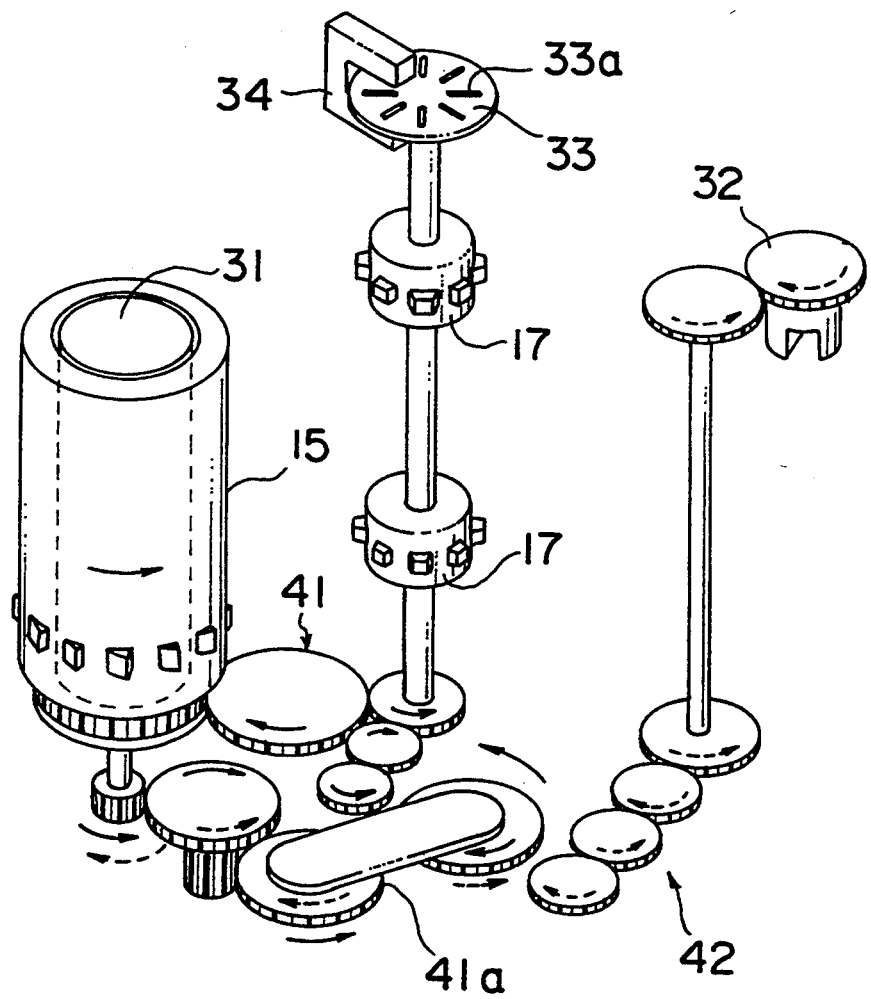
FIG. 4 is a perspective view showing principal elements of a film forwarding mechanism incorporated in this camera.

FIG. 4 shows principal elements of a film feeding mechanism of this camera in perspective view. The reference numeral 31 denotes a film feeding motor provided within the above described film takeup spool 15. The rotation of the film feeding motor 31 is transmitted via a speed reducing gear train 41 including a planetary gear mechanism 41a. When the motor 31 is operated in the counter clockwise rotational direction as seen in the figure as shown by the solid rotational arrow thereon, both the sprockets 17 and the film takeup spool 15 are rotated in the counter clockwise rotational direction as seen in the figure, and thereby the film is forwarded in a film wind up direction. The upper and lower sprockets 17 are formed with sprocket teeth which engage into perforations formed along the upper and lower edges of the film (not shown in the figures), and the sprockets 17 are rotated along with film feeding action. On the other hand, when the motor 31 is operated in the clockwise rotational direction as seen in the figure as shown by the dashed rotational arrow thereon, the rotation of the motor 31 is transmitted via a speed reducing gear train 42 to a fork member 32, then the fork member 32 is rotated in the clockwise rotational direction. This fork member 32 is engaged with a film spool (not particularly shown) on which the film is rolled within the film cartridge, and when thus the fork member 32 is rotated in the clockwise rotational direction the film is rewound back onto the film spool.

At the upper end as seen in the figure of the axle on which the sprockets 17 are integrally formed, there is further integrally formed a slotted circular plate 33, through which a plurality of slits 33a are pierced at equal angular intervals all around it. The reference numeral 34 denotes a photointerruptor of a per se known type, which comprises a light emitting element and a light receiving element (neither of which is particularly shown in the figure). The edge of the slotted circular plate 33 is inserted in a slot between the light emitting element and the light receiving element. Accordingly, in a per se known manner, as the sprockets 17 and their axle and the slotted circular plate 33 rotate together, the photointerruptor 34 emits a pulse signal the number of pulses of which in any particular time period depends on the total angular distance through which the sprockets 17 etc. have rotated in the particular time period. Accordingly, by counting the number of pulses emitted by the photointerruptor 34, it is possible to determine how far the film has been forwarded and pulled out from the film cartridge.

Figure 1:
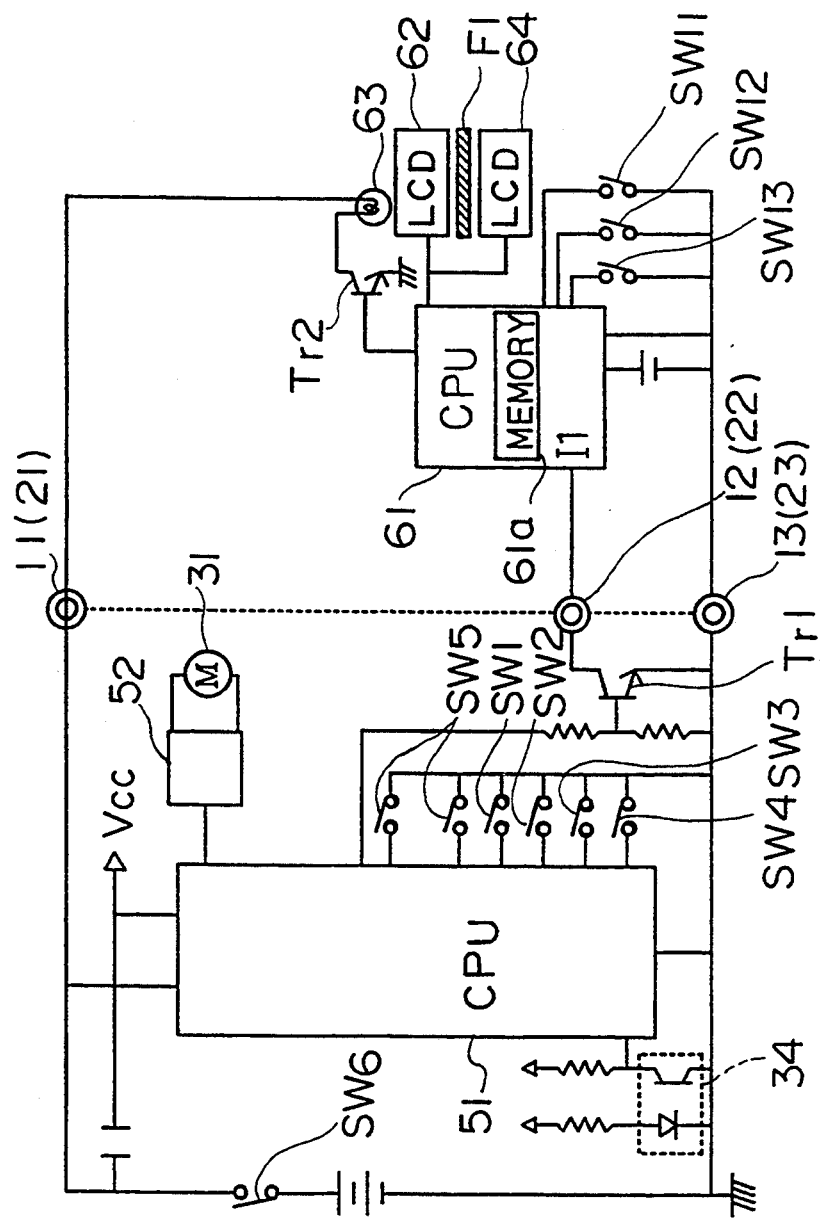
FIG. 1 is a block diagram showing a control system for a camera system according to the first preferred embodiment of the present invention.

FIG. 1 is a block diagram showing a main control system housed in the main body 10 of the camera and an imprinting control system housed in the rear film lid 20. The main control system housed in the camera main body 10 comprises a control circuit 51 of a per se known type, hereinafter referred to as a CPU, which supplies a control signal to a motor drive circuit 52 for the film forwarding motor 31, and to which are supplied the output signal from the above described photointerruptor 34 and the output signals from a set of switches SW1 through SW5, as follows.

The lid open switch SW1 is for detecting whether or not the rear film lid 20 of the camera is properly closed against the camera main body 10, and it outputs an ON signal when said rear film lid 20 is properly closed, while it outputs an OFF signal if the rear film lid 20 is not properly closed. The first stroke switch SW2 is for detecting whether or not a shutter release button (not particularly shown) of the camera is being depressed by the camera operator as far as a first stroke position thereof, and it outputs an ON signal when said shutter release button is being first stroke operated, while it outputs an OFF signal if the shutter release button is not being first stroke operated. The second stroke switch SW3 is for detecting whether or not the shutter release button is being depressed by the camera operator as far as a second stroke position thereof, and it outputs an ON signal when the shutter release button is being second stroke operated, while it outputs an OFF signal if the shutter release button is not being second stroke operated. The rewind command switch SW4 is for the camera operator to operate in order to command rewinding of the film. And the DX switch array SW5 is a set of DX switches for reading out a film sensitivity signal from a DX code on the film cartridge, corresponding to the DX contacts 14 described previously. The switch SW6 is a main switch of the camera for controlling the supply of actuating electrical energy to the control system of the camera as a whole. When this main switch SW6 is switched ON, then the circuits on the camera main body side, i.e. housed in the camera main body 10, are supplied with electrical energy, and further, electrical energy is supplied to the circuits for film imprinting on the film lid side, i.e. to the circuits (such as an imprinting lamp 63 to be described shortly) housed in the rear film lid 20, via the contacts 11 and 13 on the camera main body 10 which are respectively contacted against the contacts 21 and 23 on the rear film lid 20.

The imprinting control system housed in the rear film lid 20 comprises a control circuit 61 of a per se known type, hereinafter referred to as a CPU, which controls the film imprinting operation. An input port I1 of this imprinting CPU 61 is connected to the main CPU 51, when the rear film lid 20 is properly closed, via contact 12 on the camera main body 10 which is contacted against the contact 22 on the rear film lid 20 and via a transistor TR1 housed within the camera main body 10. The imprinting CPU 61 is connected to an imprinting liquid crystal display (hereinafter referred to as a LCD) 62 and to a display LCD 64, as well as being connected via another transistor TR2 to the previously mentioned imprinting lamp 63.

The light emanating from the imprinting lamp 63 shines through the imprinting LCD 62 and then through the film imprinting window 24a formed through the pressure plate 24 onto the portion of a film denoted as FI which lies directly behind the film imprinting window 24a at the time, and thereby numerical, character, or symbolic data for imprinting which is being displayed on the imprinting LCD 62 is exposed onto and is imprinted on the portion of the film FI. The display LCD 64 is for externally displaying to the user of the camera a visible version of the information which is to be thus imprinted on the film FI.

In this first preferred embodiment of the present invention, along with the capability to imprint photographic data specific to each frame of the film within the picture area of the film frame or on a portion of the film in the vicinity of the film frame, there is the capability to imprint photographic data in a predetermined position on the leader portion of the film which is closer to its end portion than the first frame (i.e. on the zeroth frame area of the film). The nature and the contents of the photographic data to be imprinted will be described in detail hereinafter.

Figure 5:
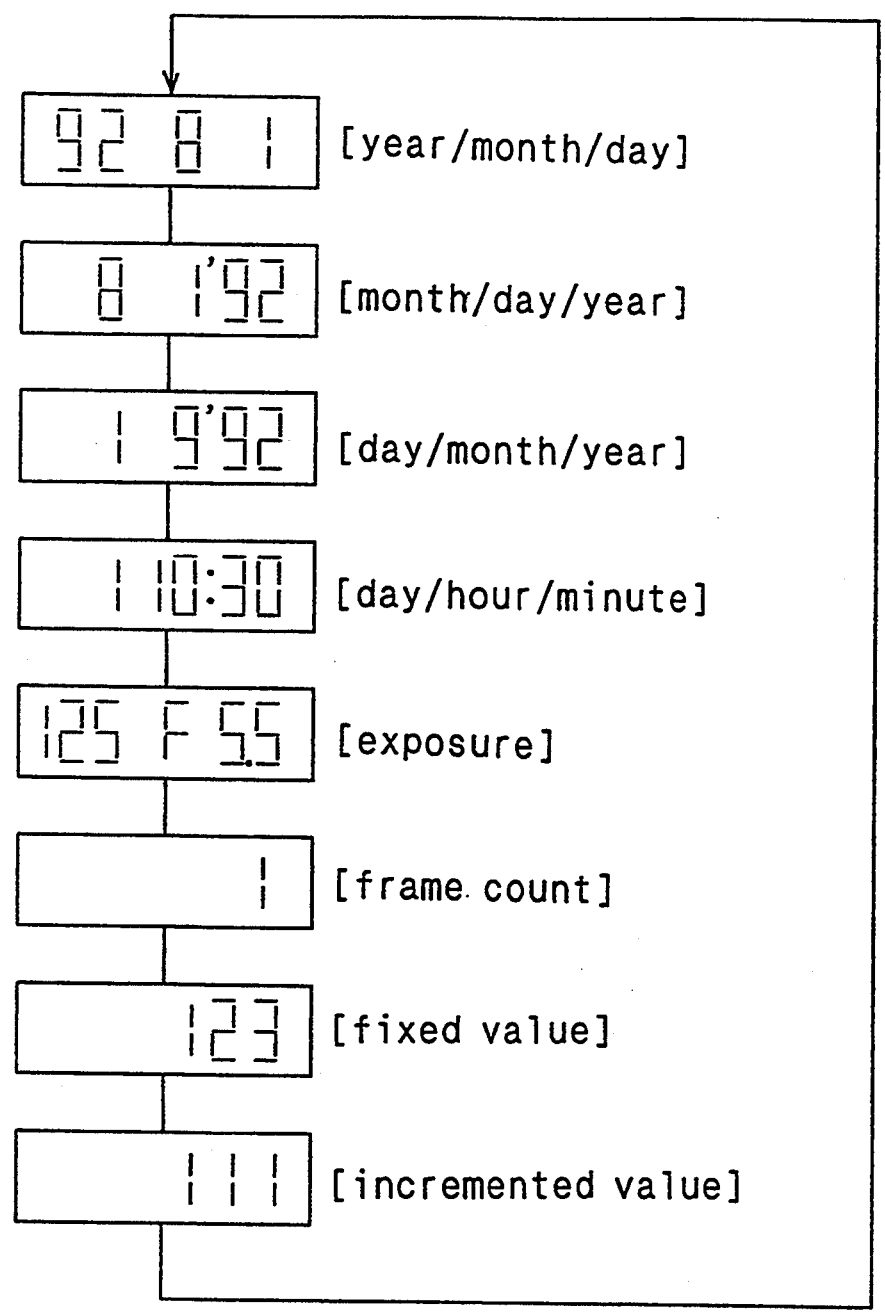
FIG. 5 is an explanatory diagram showing the sequence for setting the data to be imprinted on or near the film frames and on the zeroth frame area of a film loaded in this camera.

To the input port I1 of the imprinting CPU 61 there are further connected an imprint data changeover switch SW11, a frame specific data imprint switch SW12, and a zeroth frame data imprint switch SW13. The imprint data changeover switch SW11 is for changing over the type of the imprint data, and the imprinting CPU 61 changes the type setting of the imprint data in response to operation of this switch SW11. In this first preferred embodiment of the present invention, as schematically shown in FIG. 5, every time this imprint data changeover switch SW11 is pressed, the type of the imprint data is cycled around the following cycle: [year/month/day]-[month/day/year]-[day/month/year]-[day/hour/minute]-[exposure]-[frame count]-[fixed value]-[incremented value]. This imprint data is displayed both on the imprinting LCD 62 for being imprinted and also on the display LCD 64 for being seen by the user of the camera.

In this first preferred embodiment of the present invention, the type [fixed value] for the imprint data means that the imprint data consists of a fixed numerical value, character sequence, or symbol combination previously input by the user of the camera by using an input device of per se known type not shown in the figures and this data type is used when for example a film serial number or the like is required to be imprinted. This imprint data remains constant and is never automatically altered by the camera system, being only changed when the user of the camera explicitly commands such change. And the type [incremented value] for the imprint data means that the imprint data consists of a numerical value which is incremented by one for every frame shot, and for which the initial value is input by the user of the camera by using an input device (not shown) of the above described type.

Among these types for the imprinted data, each of the data types [exposure], [frame count], and [incremented value] relates to a type of information which is applicable and relevant to each frame shot on the film but which is not applicable to the zeroth frame area of the film. In other words, such types of information are suitable for imprinting as frame specific information but are not suitable for imprinting as film specific information. On the other hand, each of the data types [year/month/day], [month/day/year], [day/month/year], and [day/hour/minute] is applicable and relevant to each frame shot on the film. If the date and/or time involved in these data can be considered as being information indicating the date and/or the time of start of use of the film itself, these types of information are suitable for imprinting as frame specific information and are also suitable for imprinting as film specific information. The data type [fixed value] relates to a film specific information but is not suitable for imprinting as frame specific information.

The frame specific data imprint switch SW12 is for commanding whether or not a frame imprint operation is performed. When this frame specific data imprint switch SW12 is ON then this frame specific imprinting, hereinafter referred to as the first imprinting action, is performed.

The zeroth frame data imprint switch SW13 is for commanding whether or not to imprint the data onto the zeroth frame area of the film, and when this zeroth frame data imprint switch SW13 is ON then this film specific imprinting, hereinafter referred to as the second imprinting action, is performed.

Figure 6A:
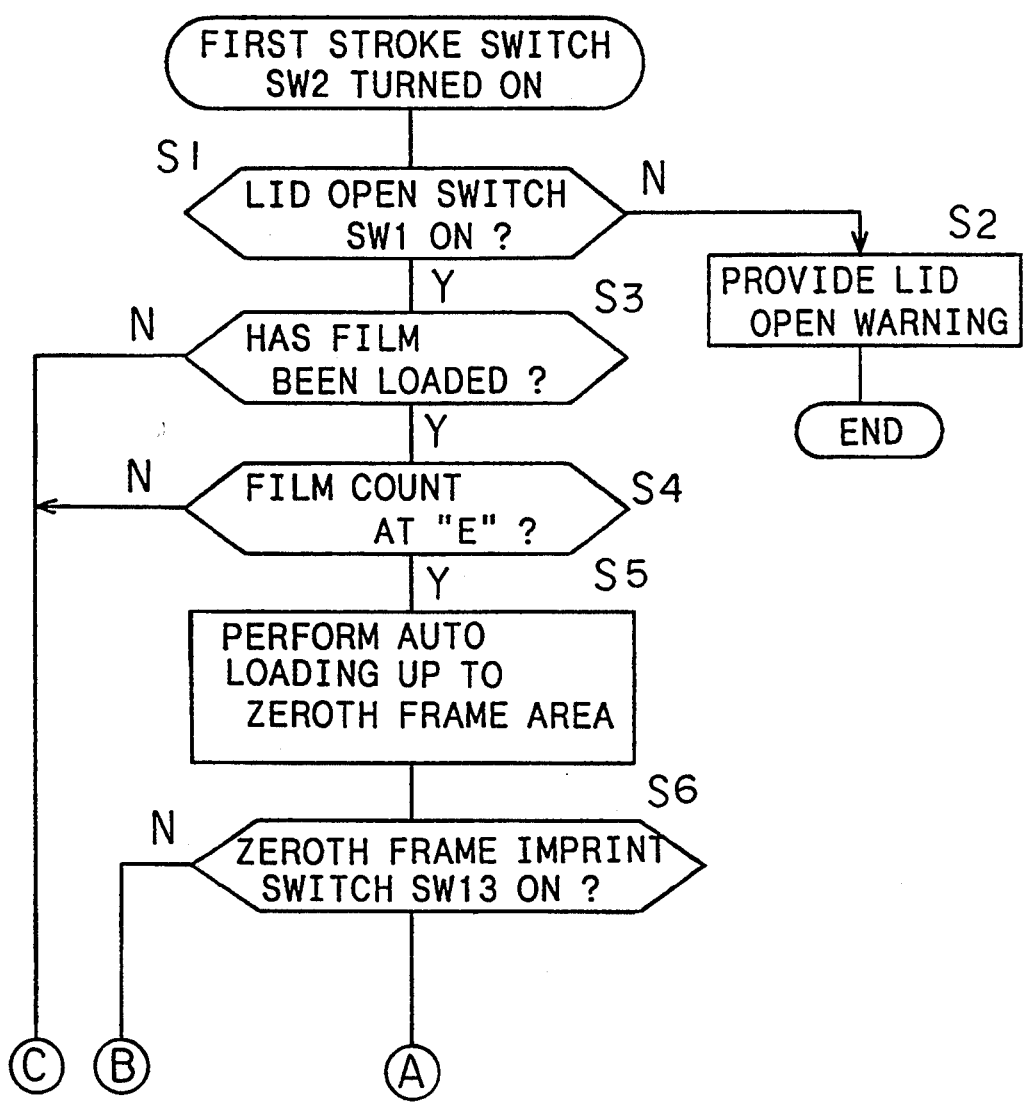
FIGS. 6A and 6B are flow charts showing the operation of a CPU program for this camera, for implementing the operation of the first preferred embodiment of the present invention.
Figure 6B:
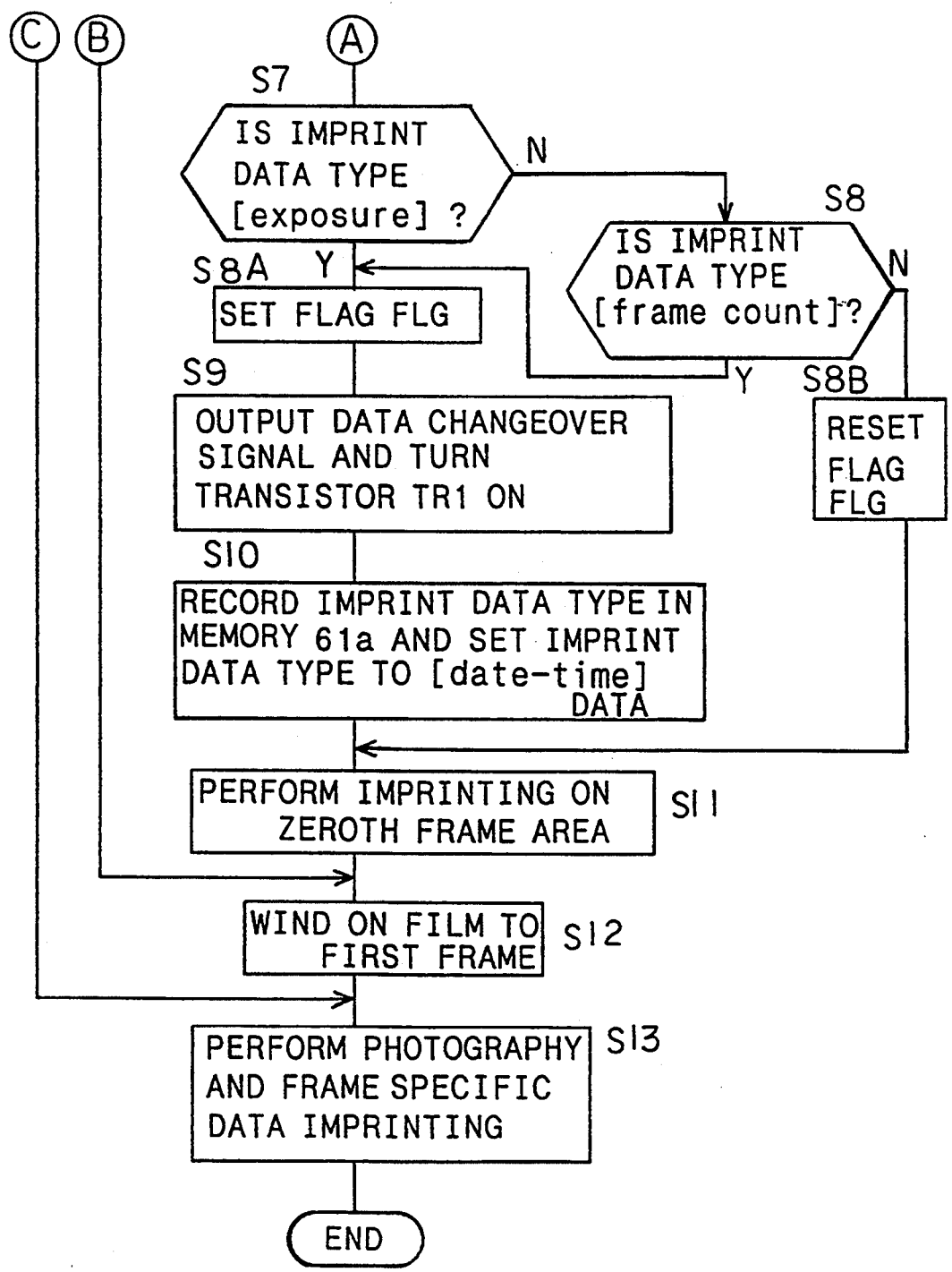

The imprinting operation implemented by the main CPU51 will now be explained with reference to flow charts as shown in FIGS. 6A and 6B.

The main CPU 51 starts to obey this program when the first stroke switch SW2 is turned ON. First, in the decision step S1, a decision is made as to whether or not the lid open switch SW1 is ON. If the result of this decision is YES, i.e. if the lid open switch SW1 is ON and therefore the film lid 20 of the camera is at the moment properly closed against the camera main body 10, then the flow of control passes next to the decision step S3; while on the other hand, if the result of this decision is NO, i.e. if the lid open switch SW1 is OFF and therefore the film lid 20 is currently not properly closed, then the flow of control passes next to the step S2. In the step S2, a lid open warning takes place, and then the execution of this program is terminated. On the other hand, in the step S3, a decision is made as to whether or not a film cartridge is currently loaded in the camera. If the result of this decision is YES, i.e. if a film cartridge is currently loaded, then the flow of control passes next to the decision step S4; while on the other hand, if the result of this decision is NO, i.e. if no film is currently present in the camera, then the flow of control skips to pass next to the step S13.

In the decision step S4, a decision is made as to whether or not the frame count is at "E" which shows that the film has not yet been wound on to the first frame thereof (the frame count is maintained by a frame counter of a per se known type, not particularly shown in the figures). If the result of this decision is NO, i.e. if the frame count is not currently at "E" which means that the auto loading for this film has already been performed to completion and the film is therefore now positioned at a frame to be shot, then the flow of control skips to pass next to the step S13. On the other hand, if the result of this decision is YES, i.e. if the frame count is currently at "E" which means that now film auto loading should be performed to wind the film on to the first frame thereof, then the flow of control passes next to the step S5.

In this next step S5, the auto loading process for this film is performed: in other words, the film is wound on as far as the zeroth frame area thereof. In detail, the main CPU 51 activates the motor drive circuit 52 so as to drive the film feeding motor 31 in the counter clockwise direction as seen in FIG. 4, and thereby as previously explained in detail, via the gear train 41, both the sprockets 17 and the film takeup spool 15 are rotated in the counter clockwise rotational direction. Accordingly, the film is wound up on the film takeup spool 15. When the portion of the film on which the first frame is to be shot has almost but not quite reached the aperture AP, i.e. when the zeroth frame area of the film is confronting the aperture AP and lies directly behind the film imprinting window 24a, the main CPU 51 controls the motor drive circuit 52 so as to stop driving the film feeding motor 31 and thereby the movement of the film is stopped, and then the flow of control next proceeds to the decision step S6. The main CPU 51 determines when the film has been wound on far enough for the zeroth frame area of the film to be confronting the aperture AP and to be lying directly behind the film imprinting window 24a from the output signal from the photointerruptor 34.

In the next decision step S6, a decision is made as to whether or not the zeroth frame data imprint switch SW13 is ON, i.e. whether imprinting on the zeroth film frame area is being ordered. Information relating to the ON or OFF condition of the zeroth frame data imprint switch SW13 is transmitted to and is input into the main CPU 51 via the imprinting CPU 61 and the contacts 12 and 22 on the camera main body 10 and on the rear film lid 20 respectively. Accordingly it is possible for the imprint/no imprint decision in this step S6 to be made by the main CPU 51.

When the decision in the step S6 is negative, the program goes to the step S12 and when an affirmative answer is obtained in the step S6, the program goes to the step S7.

In the decision step S7, a decision is made as to whether or not the currently set type for the imprint data is [exposure]. If the result of this decision is YES, i.e. if the imprint data type currently is [exposure], then the flow of control passes next to the step S8A; while on the other hand, if the result of this decision is NO, i.e. if the currently set type for the imprint data is some other type than [exposure], then the flow of control passes next to the decision step S8. In this decision step S8, a decision is made as to whether or not the currently set type for the imprint data is [frame count]. If the result of this decision is YES, i.e. if the imprint data type currently is [frame count], then the flow of control passes next to the step S8A; while on the other hand, if the result of this decision is NO, i.e. if the currently set type for the imprint data is some other type than [frame count] (and other than [exposure] as well, of course), then the flow of control passes next to the step S8B. As a result of these decisions made in the two decision steps S7 and S8, it will be understood that the flow of control passes to the step S8A if the imprint data type currently is either [exposure] or [frame count], while on the other hand the flow of control passes to the step S8B if the imprint data type currently is neither [exposure] nor [frame count].

In the step S8B, a flag denoted as FLG is turned OFF, i.e. is reset, and then the flow of control skips next to the step S11 in which as explained shortly the actual imprinting of the imprint data on the zeroth film frame area is performed. On the other hand, in the step S8A, this flag FLG is turned ON, i.e. is set, and then the flow of control passes next to the step S9. In this step S9, the main CPU 51 outputs a data changeover signal, so as to turn the transistor TR1 ON; and then the flow of control proceeds to the next step S10. By this transistor TR1 being turned ON, a low level signal is supplied to the input port I1 of the imprinting CPU 61, and in response to this imprinting CPU 61, in the next step S10, transfers the current value of the imprint data type setting to its memory (denoted as 61a) for preservation, and performs changeover of the imprint data type setting. In other words, the imprinting CPU 61 changes the imprint data type setting to a type of [date-time] data, for example to [year/month/day]. Then the flow of control proceeds to the next step S11.

In this step S11, the imprinting on the zeroth film frame area of the currently set film specific imprint data, i.e. the so called second imprinting operation, is performed. In detail, the imprinting CPU 61 turns the imprinting lamp 63 ON for a predetermined time period, and thereby the current value of the set film specific imprint data, which is being displayed on the imprinting LCD 62, is copied onto the zeroth frame portion of the film, by the light from the imprinting lamp 63 shining through the imprinting LCD 62 and then through the film imprinting window 24a formed through the pressure plate 24 onto the zeroth frame portion of the film which is currently lying directly behind the film imprinting window 24a. Then the flow of control proceeds to the next step S12.

In this step S12, the main CPU 51 again activates the motor drive circuit 52 so as to drive the film feeding motor 31 in the counter clockwise direction as seen in FIG. 4, and thereby the film is forwarded, so as to bring its portion on which the first frame is to be shot directly behind the aperture AP; and then the main CPU 51 controls the motor drive circuit 52 so as to stop driving the film feeding motor 31 and thereby the movement of the film is stopped, and then the flow of control next proceeds to the final step S13 of this program.

In the final program step S13, the process of photography and frame specific data imprinting is performed. This process is shown in detail in FIG. 7 as a subroutine of the FIGS. 6A and 6B program.

Figure 7:
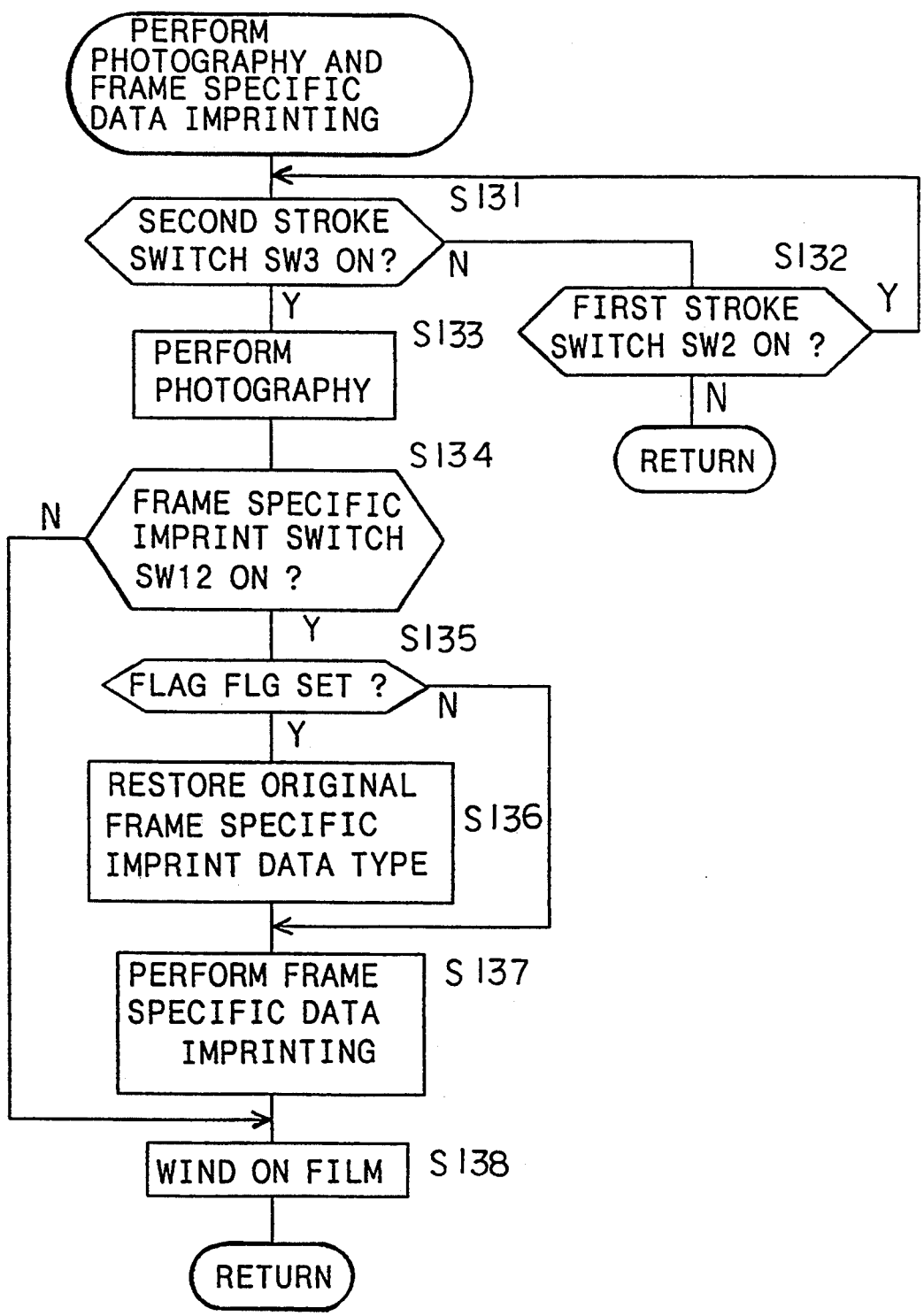
FIG. 7 is a flow chart showing the details of a step S13 of the FIG. 6 flow chart, expressed as a subroutine, for performing the processes of photography and frame specific data imprinting.

Referring now to FIG. 7, in the first decision step S131 a decision is made as to whether or not the second stroke switch SW3 is ON. If the decision is made that the second stroke switch SW3 is ON, the flow of control passes next to the step S133; while on the other hand, if the decision is made that the second stroke switch SW3 is OFF, then the flow of control passes next to the decision step S132. In this decision step S132 a decision is made as to whether or not the first stroke switch SW2 is ON. If the decision is made that the first stroke switch SW2 is indeed ON, then the flow of control cycles back to the decision step S131. On the other hand, if the result of the decision in the step S132 is NO, i.e. if the first stroke switch SW2 is OFF, then the flow of control next passes to return from this FIG. 7 subroutine.

In the step S133, photography is performed, and then the flow of control proceeds to the next decision step S134. In this decision step S134, a decision is made as to whether or not the frame specific data imprint switch SW12 is ON. If the result of this decision is NO, i.e. if the frame specific data imprint switch SW12 is currently OFF, then the flow of control skips to pass next to the step S138.

While on the other hand, if the result of this decision is YES in the step S134, i.e. if the frame specific data imprint switch SW12 indeed is ON, then the flow of control passes next to the decision step S135.

In this decision step S135, a decision is made as to whether or not the flag FLG is currently set. If the result of this decision is YES, i.e. if indeed the flag FLG is currently set, which indicates that in the previous step S10 of the FIG. 6 program the changeover of the imprint data type setting was performed, then the flow of control passes next to the step S136. While on the other hand, if the result of the decision in the step S135 is NO, i.e. if the flag FLG is not currently set, which indicates that in the previous program step S10 the value for the imprint data type setting was not changed, then the flow of control skips to pass next to the step S137. In the step S136, the original frame specific imprint data type is reinstated, by its original value as saved in the step S10 of the FIG. 6B program being read out from the memory 61a of the imprinting CPU 61, and then the flow of control passes next to the step S137.

In this step S137, the imprinting on the current film frame of the currently set frame specific imprint data is performed. In detail, the imprinting CPU 61 turns the imprinting lamp 63 ON for a predetermined time period, and thereby the current value of the set frame specific imprint data, which is being displayed on the imprinting LCD 62, is imprinted within the picture area of the current film frame or on a portion of the film in the vicinity of said current film frame, by the light from the imprinting lamp 63 shining through the imprinting LCD 62 and then through the film imprinting window 24a onto the portion of the film which is currently lying directly behind the film imprinting window 24a. Then the flow of control proceeds to the next step S138. In this last subroutine step, the film is wound on by one frame, and then this FIG. 7 subroutine terminates.

According to this procedure as described above, when a film is loaded into this camera, while the film is being wound on to the first frame thereof during the film auto loading process, provided that the zeroth frame data imprint switch SW13 is ON, the winding on of the film is temporarily stopped when the so called zeroth film frame portion is positioned directly opposing the film imprinting window 24a, and the second imprinting operation is performed. At this time, if the setting for imprint data is [exposure] or [frame number], which of course are types of data which, although meaningful as frame specific imprinting data, are meaningless for film specific imprinting, then, before this film specific second imprinting operation is performed, a data changeover signal is output, and this causes the imprint data type to be forcibly changed over. In other words, the type of the imprint data is forcibly changed from its original value of [exposure] or [frame number] to a type of [date-time] data, which is regarded as being film specific data indicating the date and/or time of commencement of use of this film. Then the film specific second imprinting operation is performed, in order to imprint this [date-time] data on the zeroth film frame portion as film specific imprint information. In this way, even if the camera user forgets to reset the imprint data type for use with the film specific imprinting operation, or sets the film specific imprint data type erroneously, nevertheless it is positively prevented that meaningless information, only suitable as frame specific information, will be imprinted on the zeroth film frame portion, and it is possible positively to ensure that appropriate or at least meaningful film specific information is imprinted on said zeroth film frame portion.

When this second imprinting operation for film specific imprint data on the zeroth film frame portion has been completed, then the film winding on operation is recommenced, and the film is wound on until the portion thereof on which it is appropriate to shoot the first film frame is positioned against the aperture AP. Subsequently, when the operator of the camera presses the release button thereof as far as its second stroke position, so that the second stroke switch SW3 turns ON, a frame is shot onto the film, and then, provided that the frame specific data imprint switch SW12 is ON, the first imprinting operation for frame specific imprint data is performed. If for the previously described second imprinting operation for film specific data on the zeroth film frame portion the data type for the imprint data was forcibly changed to a data type suitable for film specific imprinting as explained above, then before this frame specific first imprinting operation is performed the imprint data type setting is forcibly changed back to the original frame specific imprint data type. Accordingly, it is positively prevented that film specific imprint data should erroneously be imprinted as frame specific imprint data.

Figure 8A:
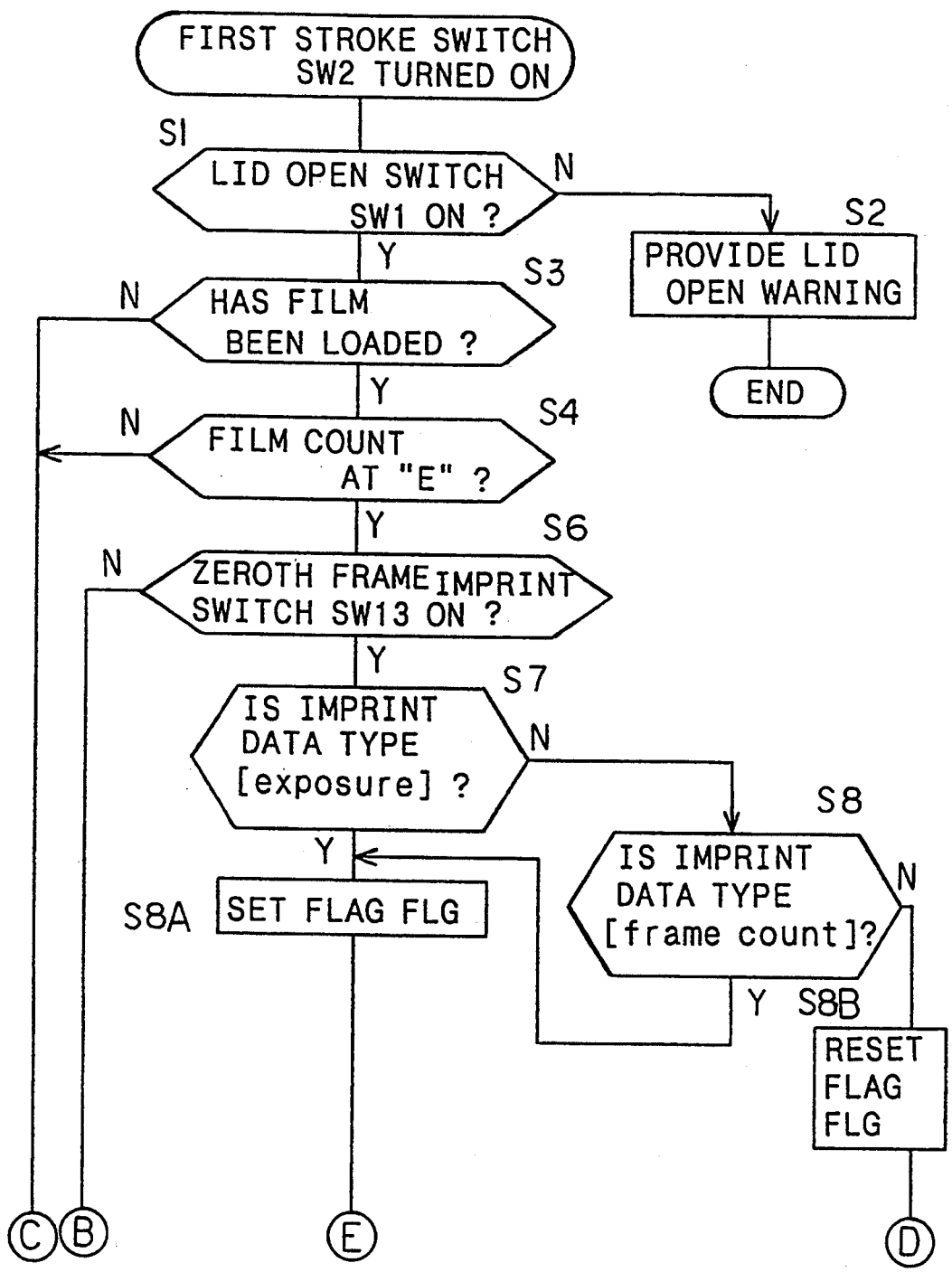
FIG. 8A and 8B are flow charts showing a variant of the first preferred embodiment.
Figure 8B:
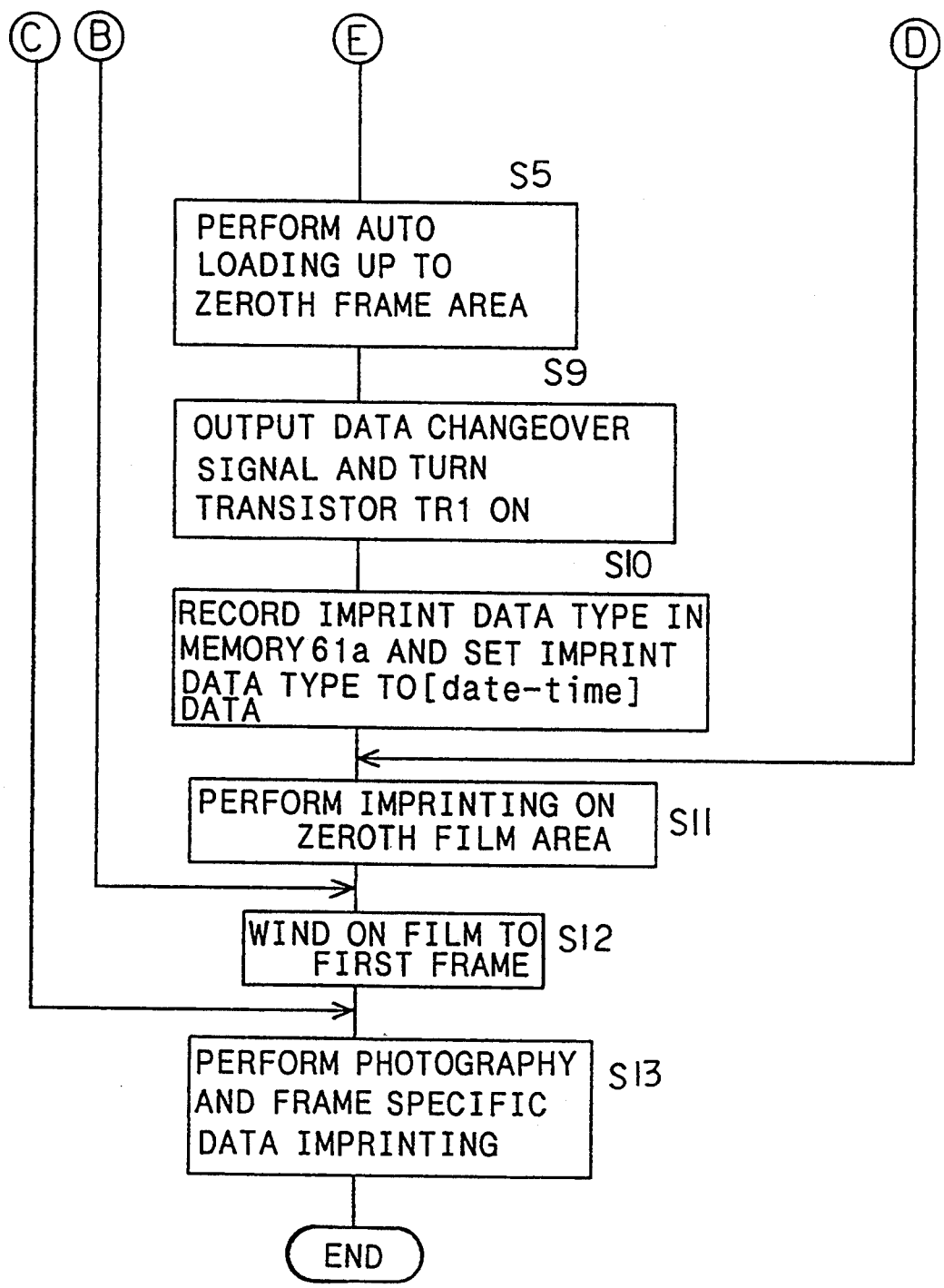

In the above shown first preferred embodiment, after the auto loading process for the film in which it was wound on so far as to position the zeroth film frame area to oppose the film imprinting window 24a was completed, the changing over of the imprint data type is performed, if so deemed necessary. However, this order for performing these steps is only exemplary and is not essential to the present invention. In FIGS. 8A and 8B, an alternative order for these steps is shown, according to a modification of the first preferred embodiment of the present invention. In this modification, before performing the auto loading process, the decision as to whether or not to change over the imprint data type is performed in the decision steps S7 and S8, and if necessary the imprint data type is thus changed over in the step S10 after the auto loading process.

In the above shown first preferred embodiment of the present invention, when it was found that the imprint data setting was not suitable for application to the second data imprint operation for film specific information on the zeroth film frame area, the imprint data setting was forcibly changed from its original value to a type of [date-time] data such as for example [year/month/day]; but this is not to be considered as being limitative of the present invention, since a different imprint data type could alternatively be employed without departing from the scope of the present invention, as long as the imprint data type was suitable for film specific imprinting on the zeroth film frame area.

Preferred Embodiment 2

Although, in the first preferred embodiment described above, when it was decided that the set imprint data type was not suitable or appropriate for imprinting on the zeroth film frame portion as film specific imprint data, the imprint data type was forcibly changed over to a more appropriate data type in response to a data changeover signal, this is not an essential feature of the present invention, but only an aspect of the first preferred embodiment. In the following, a second preferred embodiment of the present invention will be described, in which, on the contrary, if the set imprint data type is not suitable or appropriate for imprinting on the zeroth film frame portion as film specific imprint data, then, without performing any changeover of the imprint data type, a visible or audible warning is given to the user of the camera by way of a display or buzzer or the like.

Figure 9:
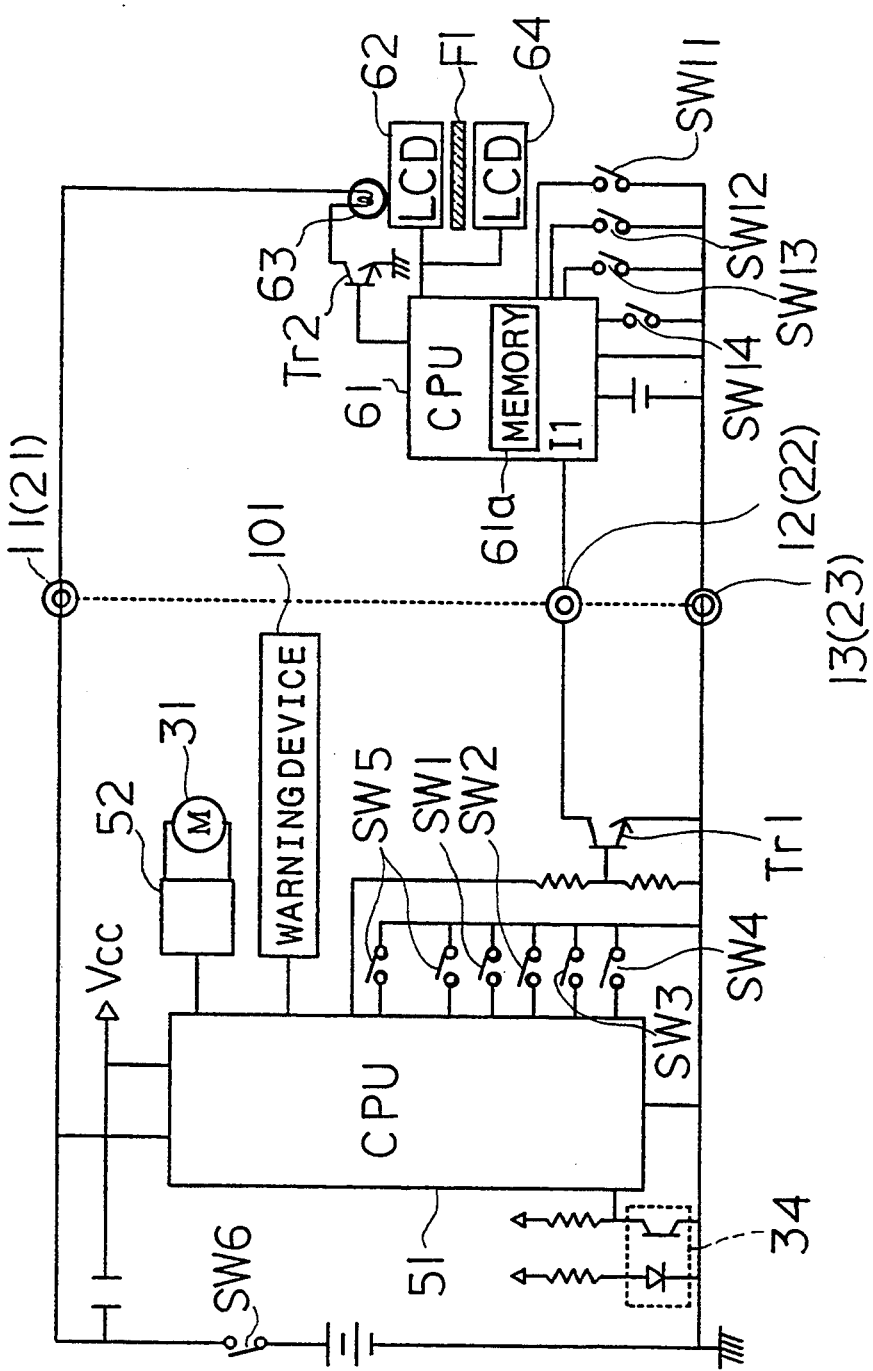
FIG. 9 is a block diagram, similar to FIG. 1 for the first preferred embodiment, showing a control system for a camera system according to the second preferred embodiment of the present invention.

FIG. 9 is a block diagram, similar to FIG. 1 for the first preferred embodiment, showing a control system for a camera system according to this second preferred embodiment of the present invention. This control system only differs from the FIG. 1 control system in that a warning device 101 and an override zeroth frame data imprint switch SW14 are provided. The warning device 101 may, for example, be a buzzer and its associated drive circuit, which are capable of emitting a warning which is audible to the camera user; or it may be a liquid crystal display device and its associated drive circuit, which are capable of emitting a warning which is visible to the camera user. And the override zeroth frame data imprint switch SW14 is for overridingly commanding zeroth film frame imprinting, even after a warning has been given by the warning device 101 that the currently set imprint data type is not appropriate for film specific imprint data.

Figure 10:
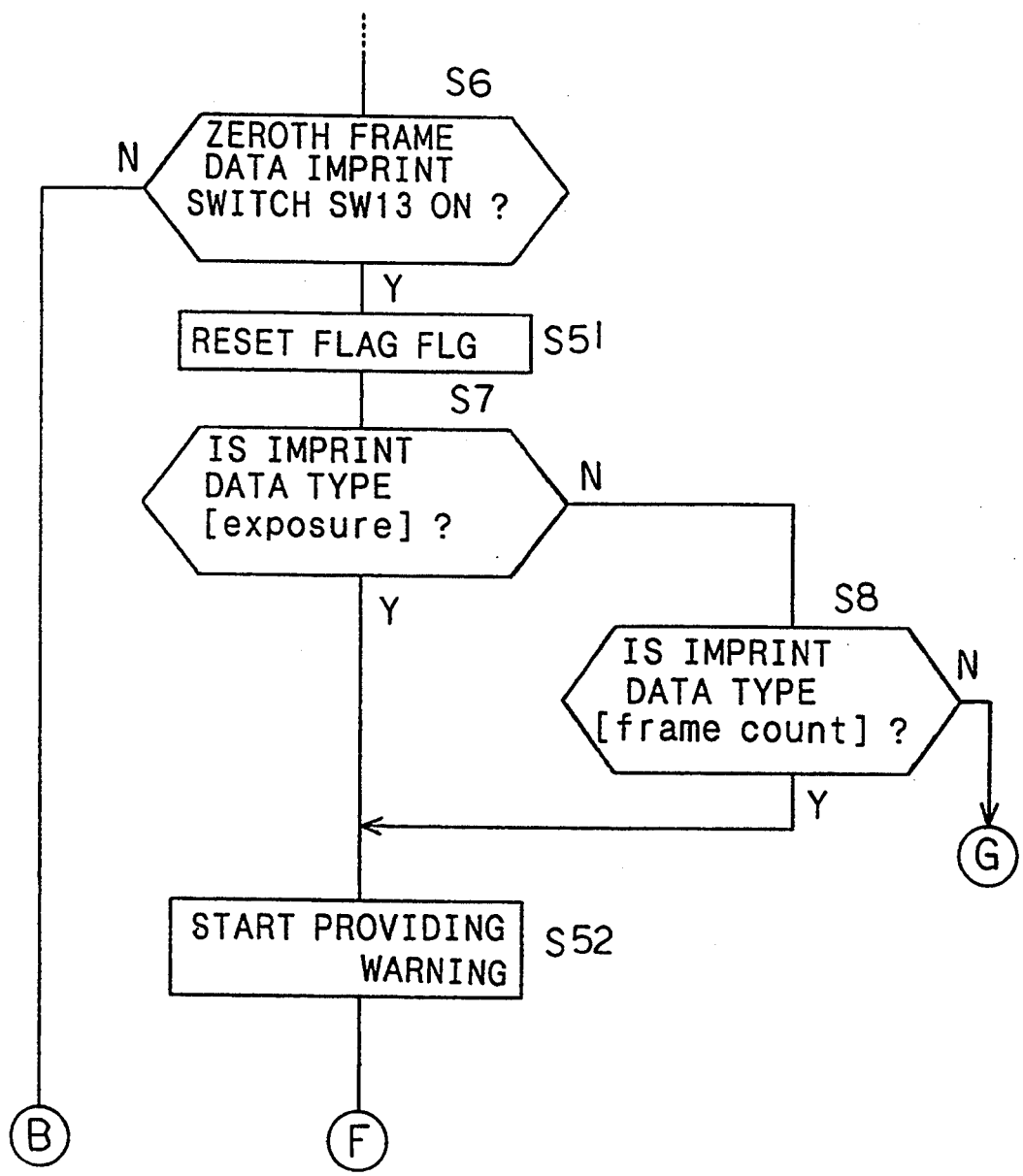
FIGS. 10A and 10B are flow charts for explanation of the operation of this second preferred embodiment.
Figure 10B:
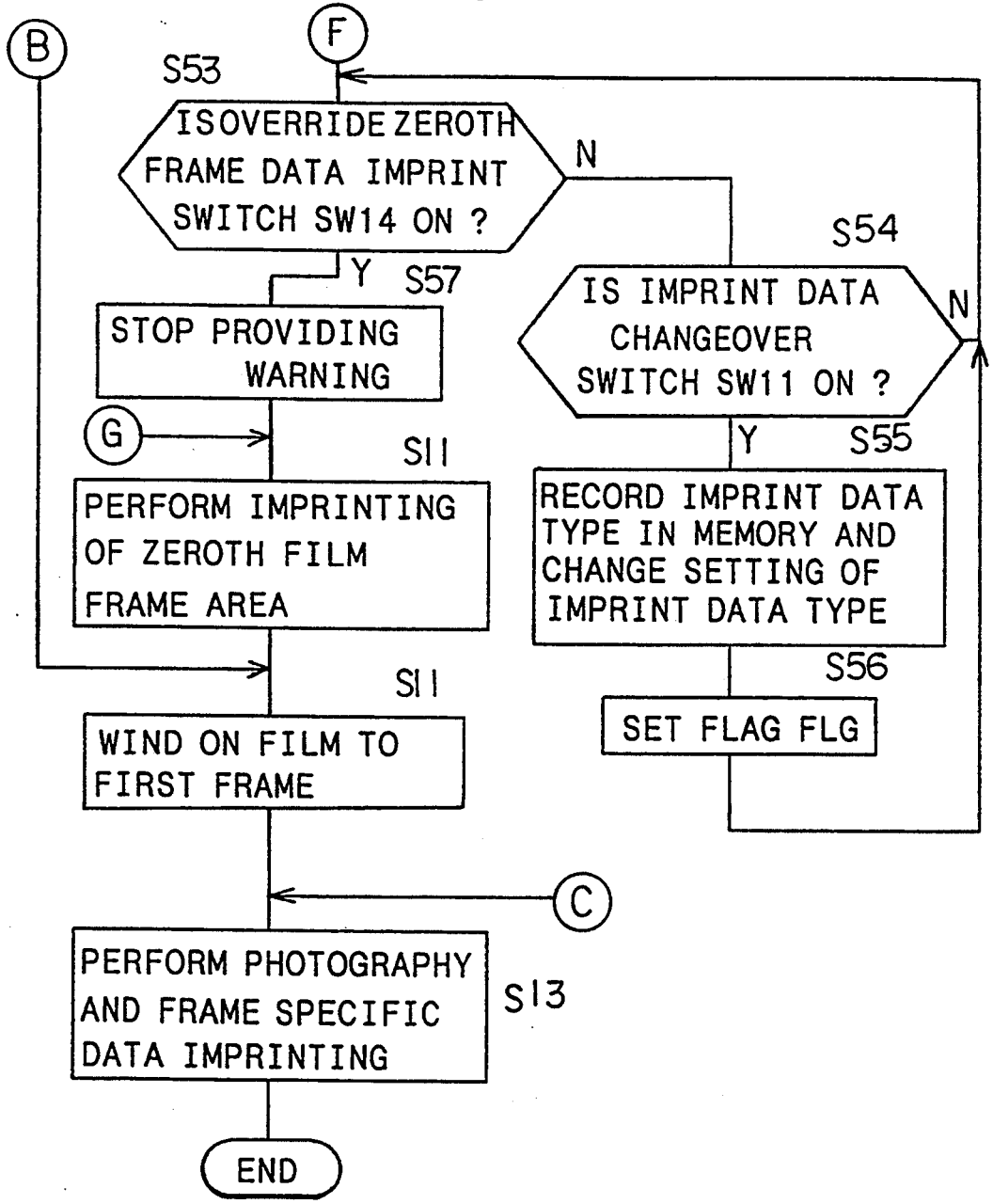

FIGS. 10A and 10B are flow charts showing the operation of a program for implementing the operation of this second preferred embodiment of the present invention. Steps in FIGS. 10A and 10B which are substantially identical in function to steps in the flow chart shown in FIGS. 6A and 6B are designated by the same symbols. The program will now be explained with reference to this flow chart.

After the steps S1 through S6 which are substantially the same as in the first preferred embodiment (and therefore the steps S1 through S5 are not even shown in FIG. 10), the flow of control passes next to the step S51, in which the flag FLG is reset. Next the flow of control passes to the two decision steps S7 and S8 in sequence, and if the results of both of the decisions in these decision steps S7 and S8 are NO, then the flow of control passes next to the step S11. While, on the other hand, if either of these decisions yields a YES result, then the flow of control passes to the step S52. In this step S52 the warning device 101 is controlled so as to start providing a warning, and then the flow of control passes next to the decision step S53.

In this decision step S53, a decision is made as to whether or not the override zeroth frame data imprint switch SW14 is ON. If the result of this decision is NO, i.e. if the override zeroth frame data imprint switch SW14 is OFF, then the flow of control passes next to the decision step S54. In this decision step S54, a decision is made as to whether or not the imprint data changeover switch SW11 is ON. If the result of this decision is YES, i.e. if the imprint data changeover switch SW11 is ON, then the flow of control passes next to the step S55. In this step S55, the current value of the imprint data type setting is transferred to the memory 61a for preservation, and performs changeover of the imprint data type setting in response to the ON condition of the imprint data changeover switch SW11. Then the flow of control proceeds to the next step S56, in which the flag FLG is set; and then the flow of control loops back to the decision step S53 again.

If the result of the decision in the step S53 is YES, i.e. if the override zeroth frame data imprint switch SW14 is ON and therefore data imprinting on the zeroth film frame area is required even though warning has been given in the step S52, then the flow of control passes next to the step S57.

In the step S57, the above described warning is terminated; and then the flow of control passes next to the step S11. The processing from this point of the program onwards, i.e. the processing performed in the steps S11 through S13 of FIG. 10B, is substantially the same as in the case of the first preferred embodiment as shown in FIG. 6B and as described above, and description thereof will therefore be curtailed in the interests of brevity.

According to the above procedure, if the setting for the type of data to be imprinted on the zeroth film frame area when the zeroth frame data imprint switch SW13 is ON is either [exposure] or [frame count] (which are the two imprint data types which are considered according to the as only being suitable for frame specific imprinting and as not being suitable for film specific imprinting), then before performing the zeroth film frame imprinting operation the data changeover signal is output, and along with this a warning is emitted. When the user of the camera perceives this warning, he or she is informed that the current imprint data type setting is considered as unsuitable for film specific data imprinting. If the camera user operates the imprint data changeover switch SW11 after this warning has started to be emitted, then the imprint data type is changed over. In any event, after the warning has started to be emitted, when the camera user operates the override zeroth frame data imprint switch SW14, the imprint data of the currently set type is imprinted on the zeroth film frame portion as film specific imprint data. Thereby, with this second preferred embodiment of the present invention, if the camera user forgets to reset the imprint data type for use with the film specific imprinting operation, or sets the frame specific imprint data type erroneously, then he or she is provided with a clear and positive warning that the current imprint data type setting will cause presumably meaningless information, considered as only suitable as for imprinting as frame specific information, to be imprinted on the zeroth film frame portion; and thereby it is possible to ensure that the camera user is given the opportunity to change the imprint data setting at this time, in order to cause appropriate or at least meaningful film specific information to be imprinted on the zeroth film frame portion. However, with this second preferred embodiment of the present invention, in contrast to the first preferred embodiment described previously, it is possible for the camera user to override this warning (by operating the override zeroth frame data imprint switch SW14 without previously having operated the imprint data changeover switch SW11), so as willfully to cause the presumably inappropriate information to be imprinted on the zeroth film frame portion. The camera user might in some special circumstances consider this procedure desirable.

When this so called second imprinting operation for film specific imprint data on the zeroth film frame portion has been completed, then the film winding on operation is recommenced, and the film is wound on until the portion thereof on which it is appropriate to shoot the first film frame is positioned against the aperture AP. Subsequently, when the operator of the camera presses the release button thereof as far as its second stroke position, so that the second stroke switch SW3 turns ON, a frame is shot onto the film, and then, provided that the frame specific data imprint switch SW12 is ON, the first imprinting operation for frame specific imprint data is performed. If for the previously described second imprinting operation for film specific data on the zeroth film frame portion the data type for the imprint data was changed to a data type suitable for film specific imprinting as explained above, then before this frame specific first imprinting operation is performed the imprint data type setting is changed back to the original frame specific imprint data type. Accordingly, in a manner identical with that practiced for the first preferred embodiment, it is positively prevented that film specific imprint data should erroneously be imprinted as frame specific imprint data.

The frame specific imprint data may be imprinted either within the picture area of the corresponding film frame or on a portion of the film outside but in the vicinity of the film frame. Further, the nature of the imprint data is not to be considered as being limited by the concept of the present invention to the shown data types: for example, as film specific data, information related to film sensitivity would also be suitable for imprinting. Yet further, although as an example the imprint device was shown as being provided in the rear film lid 20 of the camera, this is not to be considered as being limitative of the present invention; the present invention is also applicable to a type of camera system in which the rear film lid 20 is replaced with a data back which serves as the imprint device. Even further, although in the shown first and second preferred embodiments of the present invention the operation of imprinting film specific information on the zeroth frame portion of the film was performed before shooting any of the frames of the film, this is not an essential feature of the present invention, but only an incidental aspect of the disclosed preferred embodiments, since it would also be acceptable, within the scope of the concept of the present invention, to perform this film specific information imprinting process on the zeroth film frame portion during the operation of rewinding of the film, after all the frames thereof were shot. Indeed it would be possible, within the scope of the concept of the present invention, to perform this process of imprinting film specific information (the so called second imprinting operation) on a tail portion of the film closer to its tail end than the last film frame shot thereon, rather than on a header portion thereof as was done with the two preferred embodiments disclosed.

We claim:

1. A camera system capable of imprinting data on film, comprising:
    (a) an imprint data setting means for selecting one of imprint data from film specific imprint data and frame specific imprint data as selected imprint data;
    (b) a commanding means for commanding a first imprinting operation in which the selected imprint data is imprinted in a predetermined imprinting position for each film frame, and for commanding a second imprinting operation in which the selected imprint data is imprinted in another position differing from all said imprinting positions for said film frames;
    (c) an imprinting means for performing said first imprinting operation and for performing said second imprinting operation according to the command of said commanding means;

(d) a determining means for determining whether the selected imprint data set by said setting means is frame specific imprint data; and (e) a data changeover signal output means for, when said second imprinting operation is commanded, outputting a data changeover signal before said second imprinting operation, if said determining means determines that frame specific imprint data is set by said setting means.

2. A camera system capable of imprinting data on film according to claim 1, wherein said imprint data setting means further comprises a first changeover means for changing over the setting of said selected imprint data to film specific imprint data, in response to said data changeover signal.

3. A camera system capable of imprinting data on film according to claim 2, wherein said film specific imprint data includes the serial number of the film, the date of starting shooting with the film, the time of starting shooting with the film, or the sensitivity of the film.

4. A camera system capable of imprinting data on film according to claim 2, wherein said frame specific imprint data includes the date of shooting the frame, the time of shooting the frame, the exposure value used for shooting the frame, or the serial number of the frame.

5. A camera system capable of imprinting data on film according to claim 2, wherein said commanding means includes a command signal output means for independently outputting a command for said first imprinting operation and a command for said second imprinting operation.

6. A camera system capable of imprinting data on film according to claim 5, wherein said command signal output means comprises a first switch which when actuated outputs a command for said first imprinting operation and a second switch which when actuated outputs a command for said second imprinting operation.

7. A camera system capable of imprinting data on film according to claim 2, wherein said imprint data setting means comprises a second changeover means which, when both said first imprinting operation and said second imprinting operation are commanded, after said second imprinting operation has been performed for said film specific imprint data to which said first changeover means has changed over the setting of said selected imprint data, and before said first imprinting operation is performed, changes the selected imprint data setting back to the original frame specific imprint data.

8. A camera system capable of imprinting data on film according to claim 1, further comprising a warning means for issuing a warning in response to said data changeover signal.

9. A camera system capable of imprinting data on film according to claim 8, further comprising a control means which, after the start of operation of said warning means, permits the changeover of the setting for the selected imprint data according to operation of said data setting means, and, when said changeover of the imprint data setting is performed, operates said imprinting means to perform said second imprint operation with the changed selected imprint data.

10. A camera system capable of imprinting data on film according to claim 9, wherein said imprint data setting means comprises a second changeover means which, when both said first imprinting operation and said second imprinting operation are commanded, after said second imprinting operation has been performed for said film specific imprint data to which said first changeover means has changed over the setting of said selected imprint data, and before said first imprinting operation is performed, changes the selected imprint data setting back to the original frame specific imprint data.

11. A camera system capable of imprinting data on film according to claim 8, wherein said film specific imprint data includes the serial number of the film, the date of starting shooting with the film, the time of starting shooting with the film, or the sensitivity of the film.

12. A camera system capable of imprinting data on film according to claim 8, wherein said frame specific imprint data includes the date of shooting the frame, the time of shooting the frame, the exposure value used for shooting the frame, or the serial number of the frame.

13. A camera system capable of imprinting data on film according to claim 1, wherein the imprint position on the film at which said second imprinting operation takes place is closer to the start of the film than the first frame shot on said film.

14. A camera system capable of imprinting data on film according to claim 13, further comprising: a film forwarding means for forwarding a film loaded in said camera system; a film forwarding control means for, when said film is loaded and provided that said second imprinting operation is ordered, controlling said film forwarding means so as temporarily to stop said film with a portion of said film closer to the beginning of said film than the portion of said film on which the first frame thereof is to be shot opposite to an aperture of said camera; and an imprinting control means for, after said film has thus been temporarily stopped, operating said imprinting means so as to perform said second imprinting operation.

15. A camera system capable of imprinting data on film according to claim 14, wherein said film forwarding control means, after said second imprinting operation has been completed, operates said film forwarding means so as to forward said film to a position in which the portion of said film on which the first frame thereof is to be shot is opposite to said aperture of said camera.

16. A camera system capable of imprinting data on film according to claim 1, comprising a camera main body and a rear lid which opens and closes over a cavity formed in the rear surface of said camera main body, wherein said imprint data setting means, said imprinting means, and said commanding means are provided in said rear lid, and wherein said data changeover signal output means is provided in said camera main body.

17. A camera system capable of imprinting data on film, comprising:

(a) an imprint data setting means for selecting one of imprint data from film specific imprint data and frame specific imprint data as selected imprint data;

(b) a commanding means for commanding a first imprinting operation in which the selected imprint data is imprinted in a predetermined imprinting position for each film frame, and for commanding a second imprinting operation in which the selected imprint data is imprinted in another position differing from all said imprinting positions for said film frames;

(c) an imprinting means for performing said first imprinting operation and for performing said second imprinting operation according to the command of said commanding means;

(d) a determining means for determining whether the selected imprint data set by said setting means is frame specific imprint data;

(e) a data changeover signal output means for, when said second imprinting operation is ordered, outputting a data changeover signal before said second imprinting operation, if said determining means determines that frame specific imprint data is set by said setting means; and (f) said imprint data setting means comprises a first changeover means for changing over the setting for said selected imprint data to film specific data in response to said data changeover signal, and a second changeover means for, when both said first imprinting operation and also said second imprinting operation are commanded, after said second imprinting operation has been completed using the film specific data to which the setting was changed over to by said first changeover means, returning the setting for the selected imprint data to its original frame specific setting, before performing said first imprinting operation.

18. A camera system capable of imprinting data on film according to claim 17, comprising a camera main body and a rear lid which opens and closes over a cavity formed in the rear surface of said camera main body, wherein said imprint data setting means, said imprinting means, and said commanding means are provided in said rear lid, and wherein said data changeover signal output means is provided in said camera main body.

19. A camera system capable of imprinting data on film, comprising:

(a) an imprint data selector that enables a photographer to select imprint data to be imprinted on film in the camera, said imprint data being selected from film specific imprint data and frame specific imprint data;

(b) an imprint operation selector that enables the photographer to selectively command one of a first imprinting operation in which the selected imprint data is imprinted in a predetermined imprinting position for each film frame, and a second imprinting operation in which the selected imprint data is imprinted in another position differing from all said imprinting positions for said film frames;

(c) a film imprinting device that performs said first imprinting operation and that performs said second imprinting operation according to the command of said imprint operation selector; and (d) a controller that:

determines whether the selected imprint data selected by said imprint data selector is frame specific imprint data, and outputs a data changeover signal before controlling said film imprint device to perform said second imprinting operation when said controller determines that said frame specific imprint data is selected while said second imprinting operation is commanded.

* * * * *